US007819132B2

(12) United States Patent
Etheridge et al.

(10) Patent No.: US 7,819,132 B2
(45) Date of Patent: *Oct. 26, 2010

(54) PRESSURE REGULATOR WITH CERAMIC VALVE ELEMENT

(75) Inventors: Dawn M. Etheridge, Newport News, VA (US); James Russell Morris, Newport News, VA (US); James Archie Wynn, Jr., Virginia Beach, VA (US)

(73) Assignee: Continental Automotive Systems US, Inc., Auburn Hills ( * ) Notice: Subject to any disclaimer, the term of this patent is extended or adjusted under 35 U.S.C. 154(b) by 592 days.

This patent is subject to a terminal disclaimer.

(21) Appl. No.: 11/291,623

(22) Filed: Dec. 1, 2005

(65) Prior Publication Data
US 2006/0108007 A1 May 25, 2006

Related U.S. Application Data

(63) Continuation-in-part of application No. 10/997,654, filed on Nov. 24, 2004.

(60) Provisional application No. 60/632,094, filed on Dec. 1, 2004.

(51) Int. Cl.
F16K 15/04 (2006.01)
F01L 3/10 (2006.01)
F16F 1/34 (2006.01)

(52) U.S. Cl. .................. 137/539; 251/337; 251/368; 267/161

(58) Field of Classification Search ........... 137/535, 137/539, 539.5, 540; 251/368, 337; 123/506, 123/511.514; 261/161
See application file for complete search history.

(56) References Cited

U.S. PATENT DOCUMENTS

| 1,317,735 | A | * | 10/1919 | Skelly | 137/539 |
| 1,512,306 | A | * | 10/1924 | Pepper | 137/539 |
| 1,659,047 | A | * | 2/1928 | Quinn | 137/539 |
| 1,671,609 | A | * | 5/1928 | Roberts | 137/539 |
| 2,034,855 | A | | 3/1936 | Alby | |
| 2,249,971 | A | * | 7/1941 | Mecorney | 137/537 |
| 2,947,529 | A | * | 8/1960 | Schwartz et al. | 267/161 |
| 3,013,792 | A | * | 12/1961 | Steinlein | 267/161 |
| 3,254,845 | A | * | 6/1966 | Schlosser | 137/539 |
| 3,483,888 | A | * | 12/1969 | Wurzel | 137/539 |

(Continued)

FOREIGN PATENT DOCUMENTS

DE 19849849 A1 5/2000

(Continued)

*Primary Examiner*—John Rivell

(57) ABSTRACT

A flow through pressure regulator apparatus and method for directing a flow of fuel within a fuel system. Present invention includes a lower housing having a fuel inlet where fuel flows through the fuel inlet and communicates with a valve biasing member through a fuel chamber and lower valve element with fuel passages. The valve biasing member permits or inhibits fuel flow through a fuel chamber by opening and closing a ceramic valve element. The valve biasing member comprises a flat disk having at least two reticulated concentric rings coupled by at least one bridge. The fuel flows past an open valve element through the lower valve element fuel passages to the valve biasing member. The valve biasing member then diffuses the flow of fuel. A fuel cover directs the flow of fuel from the valve biasing member to the fuel outlet.

12 Claims, 6 Drawing Sheets

U.S. PATENT DOCUMENTS

| | | | |
|---|---|---|---|
| 3,536,315 A * | 10/1970 | Jenkin | 267/161 |
| 3,598,389 A * | 8/1971 | Kohler | 267/161 |
| 3,934,612 A | 1/1976 | Kast | |
| 4,665,940 A * | 5/1987 | Jacobson | 137/539 |
| 4,776,430 A * | 10/1988 | Rule | 137/539 |
| 4,838,313 A | 6/1989 | Kobayashi et al. | |
| 4,862,907 A * | 9/1989 | Ledtje et al. | 251/368 |
| 5,107,890 A * | 4/1992 | Gute | 137/539 |
| 6,016,831 A | 1/2000 | Bueser et al. | |
| 6,145,536 A * | 11/2000 | Gerhard et al. | 137/510 |
| 6,293,259 B1 | 9/2001 | Kilgore et al. | |
| 6,886,590 B2 | 5/2005 | Robinson et al. | |
| 2001/0054443 A1 | 12/2001 | Niwa et al. | |
| 2002/0079000 A1* | 6/2002 | Inage et al. | 137/539 |
| 2003/0196702 A1* | 10/2003 | Bueser et al. | 137/535 |
| 2004/0177884 A1* | 9/2004 | Konishi | 137/540 |
| 2004/0206403 A1* | 10/2004 | Saitou et al. | 137/539 |

FOREIGN PATENT DOCUMENTS

| | | |
|---|---|---|
| DE | 10022275 A1 * | 12/2000 |
| EP | 1477873 A | 11/2004 |
| JP | 63-125624 U | 8/1988 |
| JP | 5-62775 U | 8/1993 |
| JP | 6-280781 A | 10/1994 |
| JP | 11-82240 A | 3/1999 |
| JP | 2000-509643 A | 7/2000 |
| JP | 2002-12470 A | 1/2002 |
| JP | 2004-150630 A | 5/2004 |
| JP | 2004-301120 A | 10/2004 |

\* cited by examiner

PRESSURE REGULATOR WITH CERAMIC VALVE ELEMENT

CROSS REFERENCE OF RELATED APPLICATIONS

This application claims priority to, and incorporates by reference herein in its entirety, pending U.S. Provisional Patent Application Ser. No. 60/632,094, filed 1 Dec. 2004. This application is a continuation in part of U.S. patent application Ser. No. 10/997,654, filed 24 Nov. 2004, the entirety of which is incorporated by reference.

FIELD OF INVENTION

This invention relates to pressure control devices in general and more particularly, a pressure control device comprising a valve assembly including a ceramic valve element used in automotive fuel systems.

BACKGROUND

Most modern automotive fuel systems use fuel injectors to deliver fuel to the engine cylinders for combustion. The fuel injectors are mounted on a fuel rail to which fuel is supplied by a pump. The pressure at which the fuel is supplied to the fuel rail must be metered to ensure the proper operation of the fuel injector. Metering is carried out using pressure regulators which control the pressure of the fuel in the system at all engine r.p.m. levels.

Most pressure regulator valves use an upper valve member made of stainless steel or other metallic material and a lower valve member or valve seat fabricated from a stainless steel or other metallic material. When the valve is open, the valve element lifts off the valve seat and may dither, making contact with the valve seat. When the valve closes, the valve element drops onto the valve seat. A high density metallic valve element has the potential to wear the sealing surface of the valve seat, which is also called galling. This wear can be attributed to the valve element impacting the valve seat and galling between the valve element and the valve seat.

Coining is a preferred method of improving the sealing surface on the valve seat. A metallic ball or the valve element is used to coin the metallic valve seat. With this process it is possible for galling to occur during coining. When the Young's Modulus of the valve element and the valve seat are similar, both parts can deform at a similar rate during the coining operation. The result may lead to poor leak performance.

Pressure regulators known in the art also use a valve biasing member biased to a valve seat with a longitudinal flow passage. At low fuel pressures, the valve seat is biased to a closed position to prevent the flow of fuel through the pressure regulator. As fuel pressure builds in the system, the pressure against the valve seat overcomes the biasing force of the valve biasing member, allowing fuel to flow through the valve seat, thereby controlling the fuel pressure in the system.

While such pressure regulators have been proven satisfactory, they require a substantial number of parts. In an ongoing effort to reduce the material and manufacturing costs of fuel pressure regulators as well as decrease poor leak performance there exists a need to develop a fuel pressure regulator that is small in size with fewer parts.

Thus, it is believed that there is a need to provide a pressure regulator to overcome the disadvantages of the known pressure regulator.

SUMMARY OF INVENTION

In accordance with one aspect of this invention, a flow through pressure regulator comprising: a lower housing having a fuel inlet wherein a flow of fuel through the fuel inlet communicates with a valve assembly through a fuel chamber; the valve assembly regulating the flow of fuel through the lower housing to a fuel outlet wherein a valve element rests on a valve seat in a closed position to prohibit the flow of fuel from the fuel chamber to the fuel outlet; a valve biasing member for biasing the valve element toward the fuel chamber in opposition to pressure exerted on the valve element by the fuel in the fuel chamber; and a fuel cover for directing the flow of fuel from the valve biasing member to the fuel outlet.

In accordance with another aspect of this invention, a valve biasing member for a flow through pressure regulator comprising: a flat disk; the flat disk affixed to a lower housing in a fixed relative position; and a flow of fuel in communication with the flat disk for controlling transmitted flow of fuel from a fuel inlet to a fuel outlet.

In accordance with another aspect of this invention, a method for reducing noise generation in a flow through pressure regulator, the method comprising: providing a passage for a fuel flow from a fuel inlet to a fuel outlet wherein a valve element prohibits the fuel flow through the passage; and communicating the fuel flow with a valve biasing member during flow through the passage.

It is therefore an object of the present invention to provide improved noise and flow characteristics of a fuel pressure regulator free of any additional parts. It is also an object of the present invention to reduce the materials and manufacturing costs of fuel pressure regulators.

DETAILED DESCRIPTION

Figure 1:
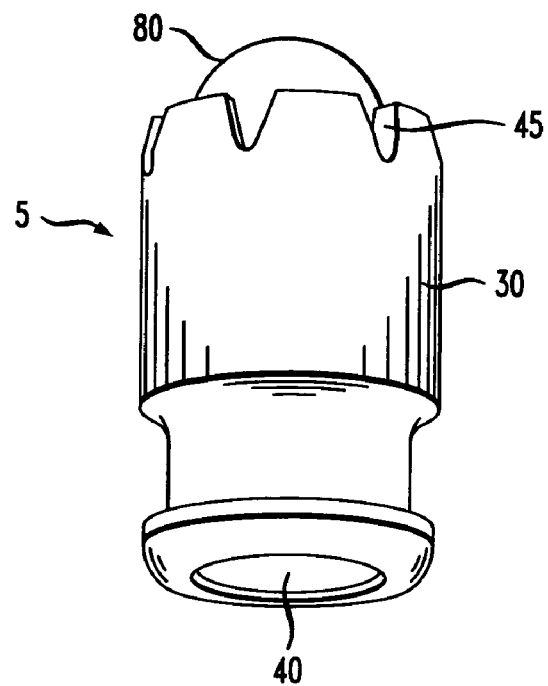
FIG. 1 illustrates a perspective view of the valve assembly.
Figure 2:
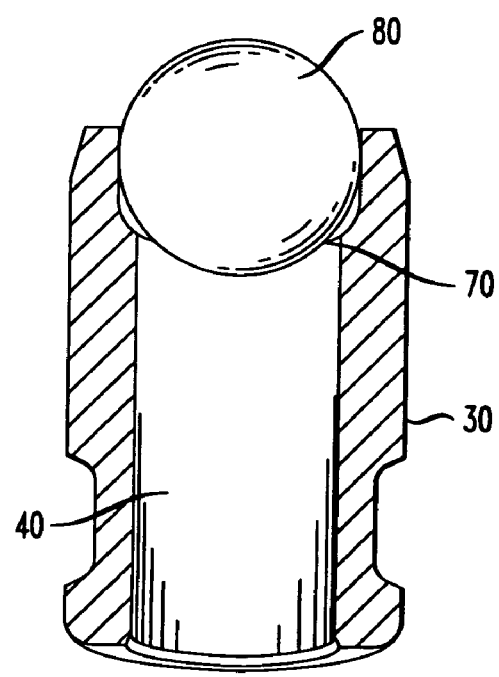
FIG. 2 illustrates is a cross section view of the valve assembly with the upper valve element in the open position.
Figure 3:
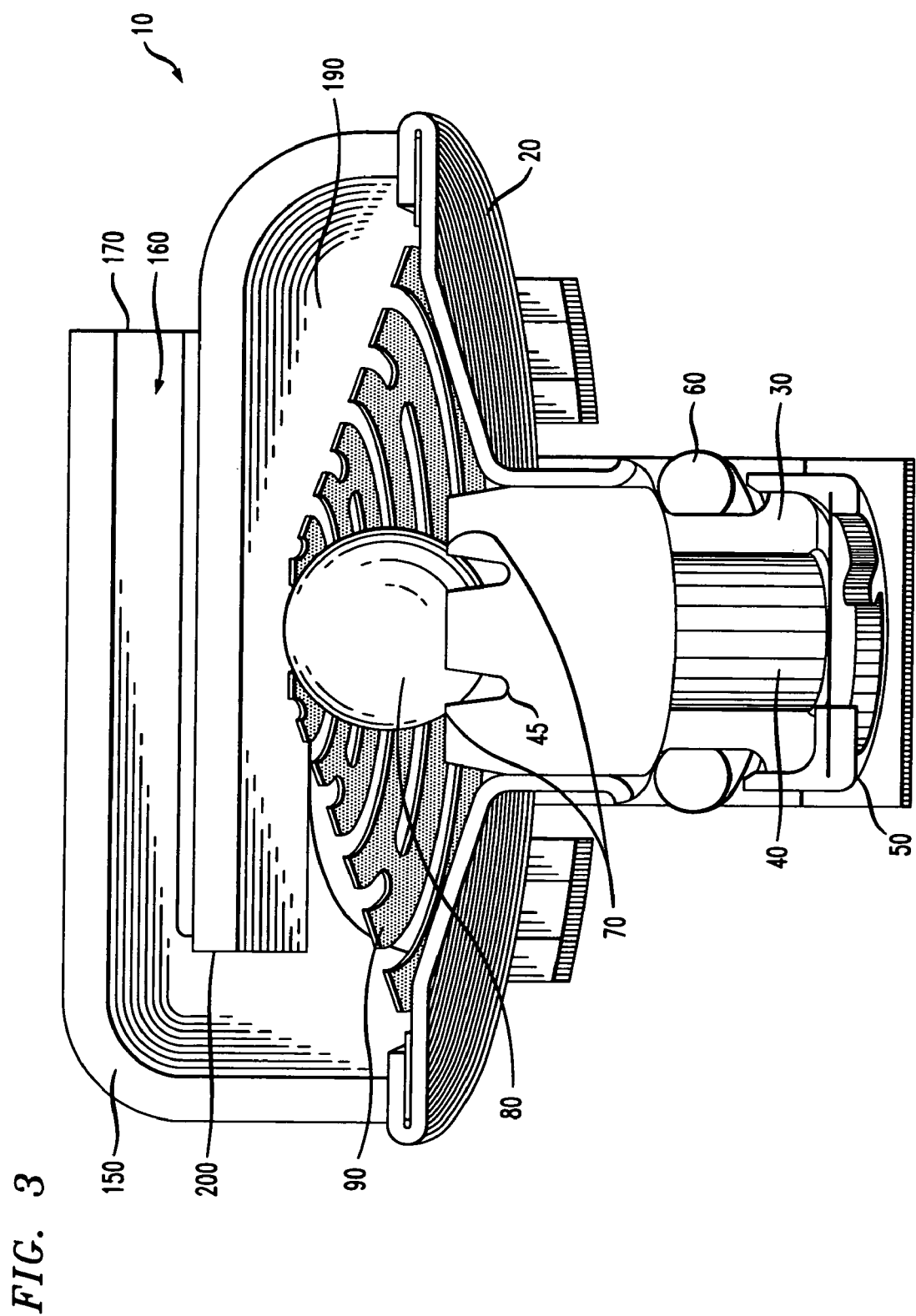
FIG. 3 illustrates a cross sectional view of the flow through pressure regulator that includes a valve biasing member.

FIGS. 1, 2, and 3 illustrate a flow through pressure regulator 10 according to the present invention. Flow through pressure regulator 10 includes a lower housing 20 that contains a fuel tube 30. Fuel tube 30 houses a fuel chamber 40 which is generally cylindrical in shape and which channels the fuel into the pressure regulator 10 from the fuel pump (not shown). In the preferred embodiment, fuel tube 30 is made from stainless steel. Fuel will first pass through a fuel filter 50 into fuel chamber 40. Fuel filter 50, generally circular in shape, it is disposed around lower portion of fuel tube 30 and adjacent to an o-ring 60. O-ring 60 is positioned below the lower housing 20 to seal and prevent any fuel leakages into other components in the system. O-ring 60 is made of an elastomeric material and is generally circular in shape. Others skilled in the art may select not to use an o-ring 60.

Flow through pressure regulator 10 also includes a valve seat 70 which cooperates with valve element 80 that is movably disposed between a closed and open position. In the closed position, the valve element 80 contacts and seals against the seating surface of the valve seat 70 and prevents fuel flow through the valve seat 70. The valve element 80 is biased into the closed position by valve biasing member 90. Valve biasing member 90 is held in place by lower housing 20 which crimps over the outer edge of valve biasing member 90. Others skilled in the art may choose to affix the valve biasing member 90 to lower housing 20 with a weld or clip. Pressurized fuel flows through and accumulates in fuel chamber 40 until the pressurized fuel contacts the bottom surface of the valve element 80. The pressurized fuel will then push valve element 80 off of valve seat 70 into an open position. The fuel flows through the valve seat 70. In manufacturing the valve seat 70, the sealing surface is coined to assure smooth sealing between the valve element 80 and the valve seat 70.

Once the pressurized fuel is released, the valve element 80 is then biased back into the closed position by the valve biasing member 90. Valve biasing member 90 functions to hold the valve element 70 of the flow through pressure regulator 10 in a closed position at a predetermined amount of pressure that is related to the pressure desired by the flow through pressure regulator 10 specification.

In the preferred embodiment, the valve element 80 is shaped as a sphere and maintains a free floating design. The valve element 80 is made of a ceramic consisting of alumina oxide, to prevent galling from occurring during coining and reduce wear on the valve seat. The valve element 80 performs in wear, heat, corrosive environments and maintains dimensional stability of temperatures up to 2000 degrees F. The valve element 80 is not retained by other components of the flow through pressure regulator 10 and therefore does not share a permanent contact with the valve biasing member 90. The valve element 80 is free to move both axially and radially when displaced from the valve seat 70. Valve biasing member 90 is positioned on the upper surface of the valve element 80 to assist with movement of the valve element 80 in an axial direction away from the valve seat 70. When the pressure of the inlet fuel is greater than the force exerted by the valve biasing member 90, the fuel pushes the valve element 80 in an axial upward direction and the valve element 80 leaves the valve seat 70. Fuel flows through the flow through pressure regulator 10 until the pressure of the valve biasing member 90 is strong enough to return the valve element 80 to the valve seat 70 thus closing the opening in the valve seat 70. Others skilled in the art may wish to select different shapes for the valve element 80 including a truncated sphere or cone. Others skilled in the art may also choose to weld the valve element 80 to the valve biasing member 90.

Figure 4:
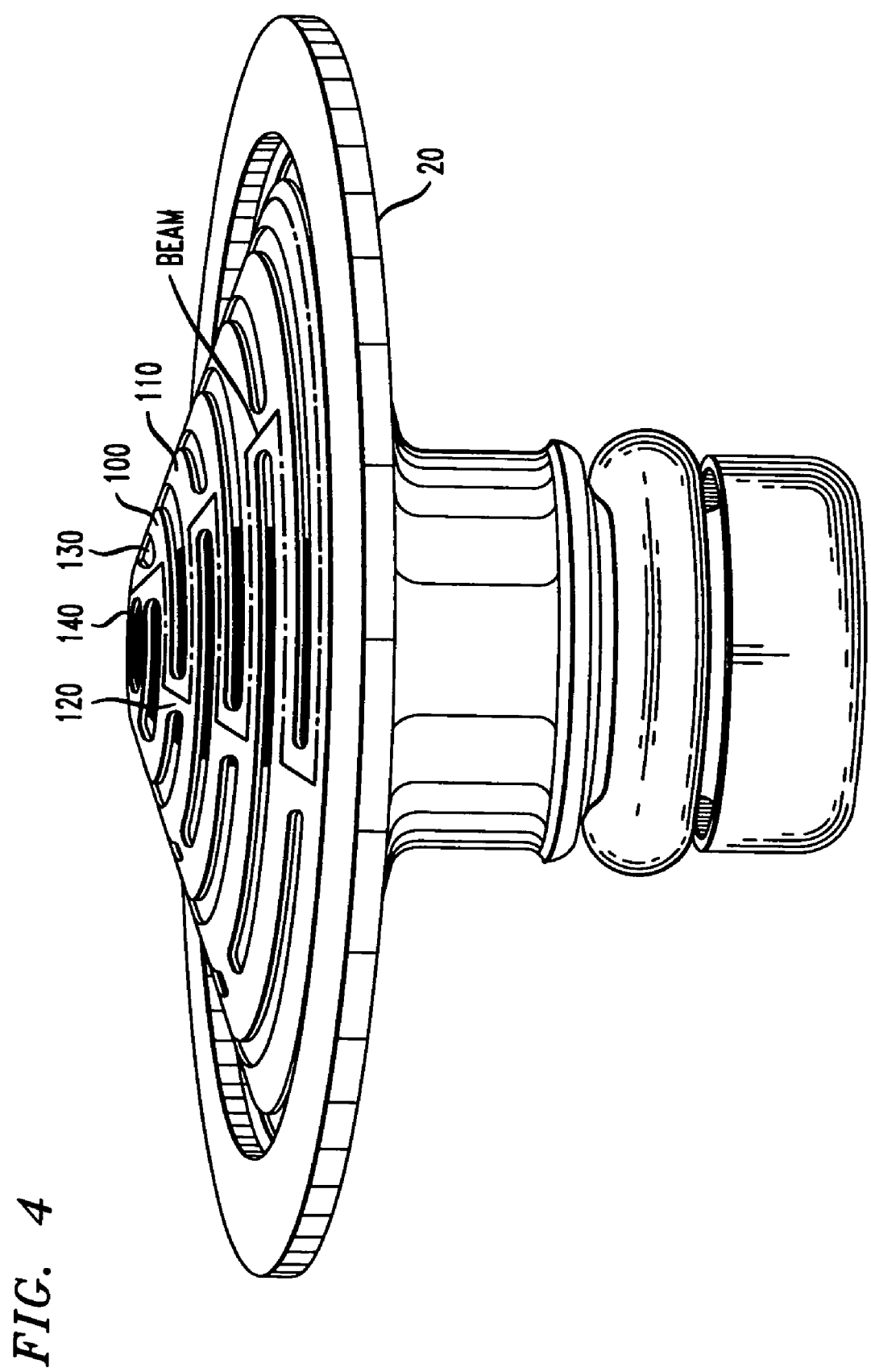
FIG. 4 illustrates a perspective view of the flow through pressure regulator that includes a valve biasing member.
Figure 5:
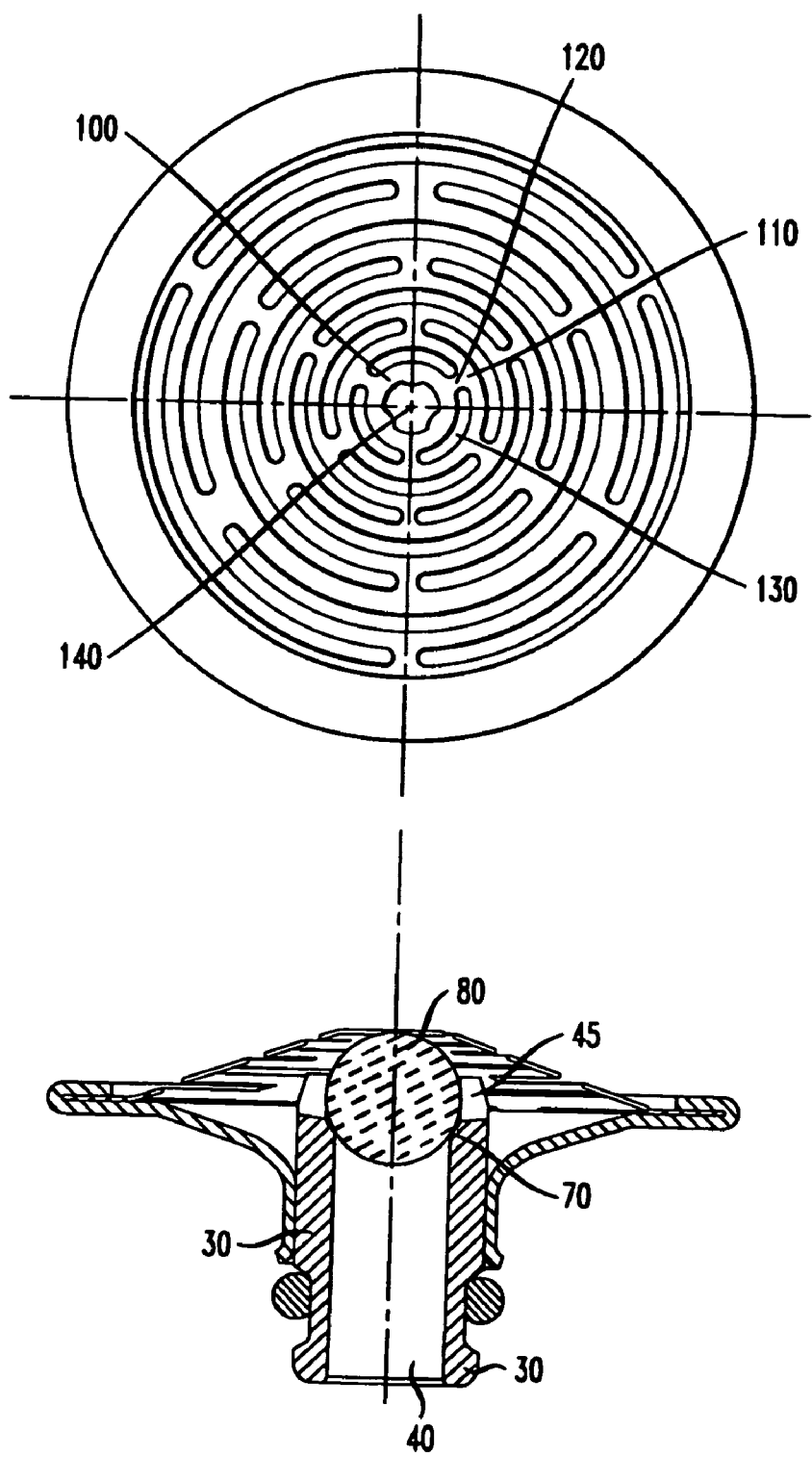
FIG. 5 illustrates a top view of the valve biasing member.

Referring to FIGS. 3, 4 and 5, the geometry of the valve biasing member 90 provides the force to close the valve element 80 and seal the opening of the valve seat 70. Valve biasing member 90 also provides the spring rate necessary to regulate the fuel pressure in the system. The geometry of valve biasing member 90 consists of at least two co-axial concentric rings 100 and 110 adhered together by at least one bridge 120. The preferred shape of the valve biasing member is annular, however, others skilled in the art may select other shapes including oval. From this geometry, balanced slot openings 130 are formed. In the preferred embodiment, the balanced slot openings 130 are arc shaped. Others skilled in the art may select a balanced slot opening 130 to be shaped as a circle, tubular, triangular or angled. Each concentric ring 110 has a beam length used to calculate the spring rate under Hookes law. The effective beam length is defined as the total length of the valve biasing member 90. The effect of changing the length of the beams, with all other factors remaining constant, will result in changes to performance criteria. At the same time, by decreasing the open area of balanced slot openings 130 where the ratio of surface area to open area is increased, the fluid flowing though the valve biasing element meets more resistance. Therefore, by increasing the effective beam length of the valve biasing member 90 and decreasing the open area of inner balanced slot opening 130, to a length greater than the radius of its largest ring, the spring rate decreases making the valve biasing member 90 less stiff. The bridge 120 connects first ring 100 with its adjacent neighbor ring 110 in a reticulated network fashion. Bridge 120 increases the effective length of the beams of valve biasing member 90 which achieves desirable spring rates for the flow through pressure regulator 10.

The valve biasing member 90 applies a balanced force to the valve element 80 that allows the valve element 80 to lift straight in an upright manner without any bias. The balanced openings 130 serve as a homogenous diffuser to direct the flow of fuel from the opening of the valve seat 70 to various directions. The balanced openings 130 disperse the fuel flow with improved flow characteristics and less noise.

The center aperture 140 of the valve biasing member 90 preferably centers on the lower housing 20 and on the central axis of valve seat 70. In the preferred embodiment, the center aperture 140 provides a three-point contact with the valve element 80. Others skilled in the art may contact the valve biasing member 90 with the valve element 80 with less than or more than three reference points. This feature centers the valve element 80 and achieves low flow linearity of the flow through pressure regulator 10 resulting in regulation at a low flow at the right pressure. There is no valve element to valve seat alignment problem with present invention and therefore, a floating valve element 80 design which typically requires an additional part and that is in common in other regulator designs is not required. Others skilled in the art may allow the valve element 80 to float in a radial direction by reducing the diameter of or eliminating entirely the center aperture 140 of the valve biasing member 90.

Figure 6:
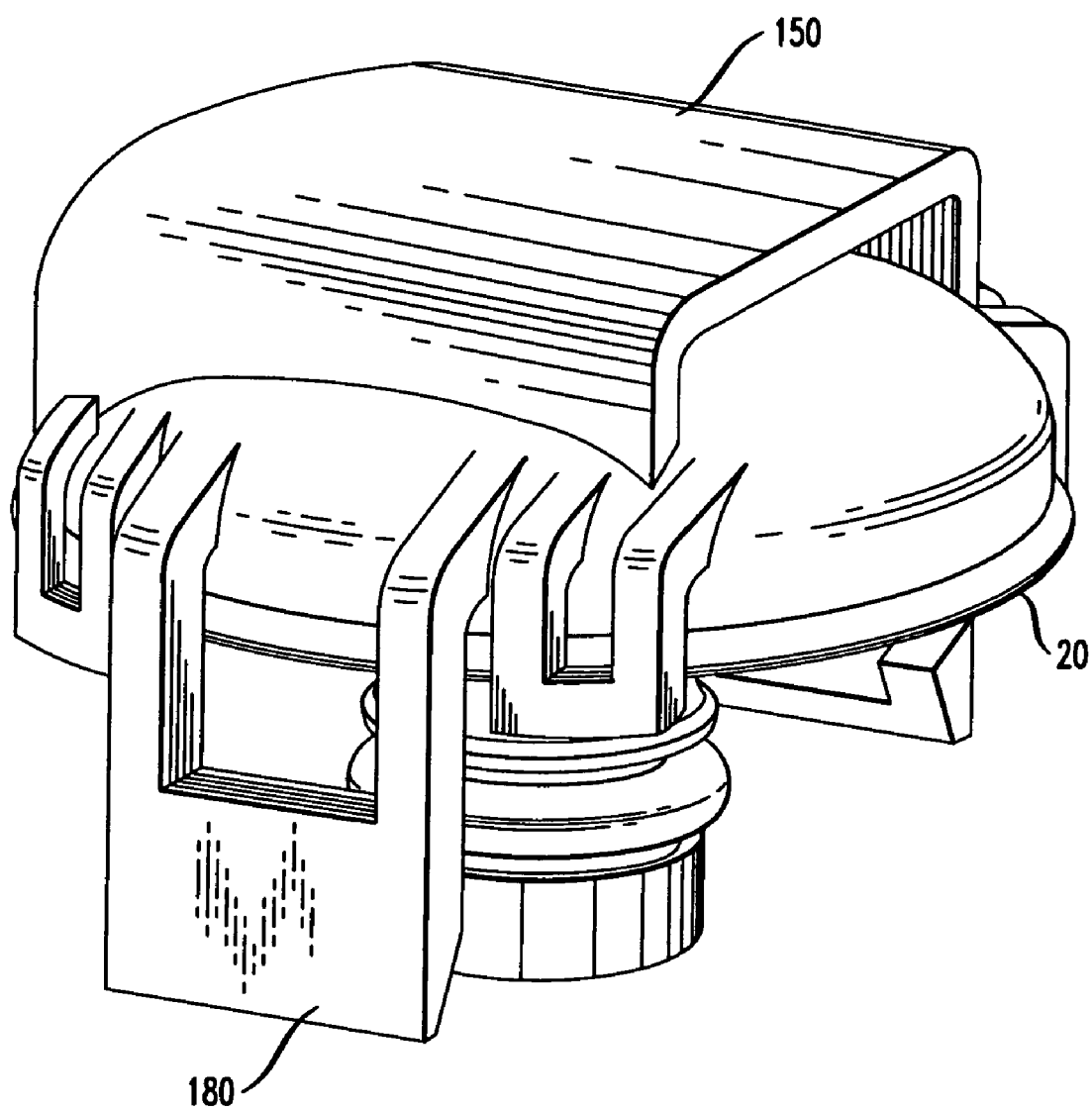
FIG. 6 illustrates a perspective view of a fuel cover.

Referring to FIGS. 3 and 6, flow through pressure regulator 10 also includes a fuel cover 150. The fuel cover 150 is made of a plastic molded material and generally houses the flow through pressure regulator 10. Fuel cover 150 includes fuel passageway 160 for directing and turning the flow of fuel from the valve biasing member 90 to fuel outlet 170. The fuel outlet 170 is generally circular in shape and located on the outer edge of cover 150. Fuel cover 150 also includes at least one snap mechanism 180 allowing ease when being affixed to the flow through pressure regulator 10. The snap mechanism 180 may be directly molded into the fuel cover 150 as an integral clip. This eliminates the need for separate clip attachments. In the preferred embodiment, the snap mechanism 180 is a tab acting as a clip to hold the flow through pressure regulator 10 in place. One skilled in the art may choose not to affix fuel cover 150 to the flow through pressure regulator 10 and use flow through regulator 10 free of fuel cover 150. Fuel cover 150 also acts to keep the valve biasing member 90 submerged in fuel at all times during fuel flow which enhances durability of the valve biasing member 90 as well as dampen any vibrating noise of the valve biasing member 90. After exiting valve biasing member 90, the fuel builds in the cover chamber 190 above the valve biasing member 90 and climbs over internal wall 200 and then flows to fuel outlet 170. By this process, the flow of fuel exits in an organized flow and does not discharge in various directions. Similarly, submergence of the valve biasing member 90 in the fuel ensures that the fuel is located on both the top portion and the bottom portion of the valve biasing member 90. Submergence of the valve biasing member 90 in fuel also ensures that the fuel is not aerated which consequently lessens noise in the flow through pressure regulator 10. Lastly, the fuel cover 150 protects the valve biasing member 90 during shipping and handling.

Figure 7:
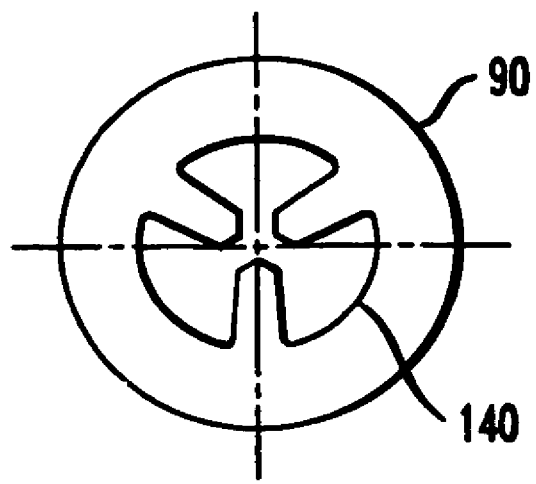
FIG. 7 illustrates a top view of an alternative 3 point of contact embodiment of the valve biasing member.
Figure 8:
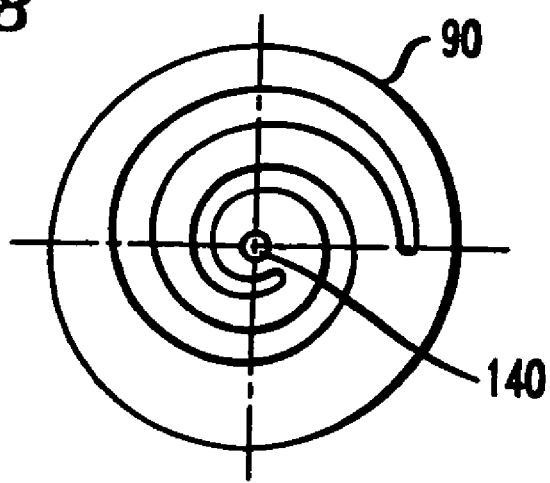
FIG. 8 illustrates a top view of an alternative spiral embodiment of the valve biasing

FIGS. 7 and 8 illustrate alternative embodiments of the valve biasing member 90. In these embodiments, all the various elements of the flow through pressure regulator 10 are identical with exception to the valve biasing member 90. In FIG. 7, the geometry of valve biasing member 90 is a flat disk including at least a three point of contact aperture 140 with no concentric ring geometry. In FIG. 8, the geometry of valve biasing member 90 is a flat disk with a spiral shape having center aperture 140.

While the present invention has been disclosed with reference to certain embodiments, numerous modifications, alterations, and changes to the described embodiments are possible without departing from the sphere and scope of the present invention. Accordingly, it is intended that the present invention not be limited to the described embodiments and equivalents thereof.

The invention claimed is:

1. A flow through pressure regulator comprising:
a housing having a fuel inlet communicating with a fuel chamber wherein a flow of fuel through the fuel inlet and the fuel chamber communicates with a valve assembly;
the valve assembly regulating the flow of fuel through the housing to a fuel outlet wherein a ceramic valve element rests on a valve seat in a closed position to prohibit the flow of fuel from the fuel chamber to the fuel outlet, the fuel outlet being on an axis different from an axis of the fuel inlet;
a valve biasing member for biasing the ceramic valve element toward the valve seat in opposition to pressure exerted on the valve element by the fuel in the fuel chamber, wherein the valve biasing member includes at least three co-axial, concentric rings joined together by a plurality of bridges in a reticulated network fashion thereby defining a plurality of co-axial, concentric slot openings in the valve biasing member at a plurality of different radii from a center of the valve biasing member, and wherein at least two bridges connect adjacent rings, the valve biasing member having a central portion constructed and arranged to contact the valve element, and a continuous annular outer edge that is affixed with respect to the housing, the central portion of the valve biasing member being in non fixed relation with the valve element to be freely movable so as to engage and bias the valve element under certain pressure conditions in the pressure regulator; and
a fuel cover, separate from the housing, the fuel cover including a chamber, in communication with and directly adjacent to the valve biasing member, constructed and arranged to contain fuel to as to submerge the valve biasing member in the fuel, the fuel cover being constructed and arranged to direct the flow of fuel by ensuring that the fuel turns in direction from the valve biasing member to the fuel outlet.

2. The pressure regulator of claim 1, wherein ceramic valve element displaces axially off the valve seat.

3. The pressure regulator of claim 1, wherein ceramic valve element comprises alumina oxide.

4. The pressure regular of claim 1, wherein valve element is one of a sphere or a truncated sphere.

5. The pressure regulator of claim 1, wherein the valve element is a free floating design.

6. The pressure regulator of claim 1, wherein valve seat is coined through a manufacturing process for smooth sealing.

7. The pressure regulator of claim 1, wherein the annular outer edge of the valve biasing member is affixed to the housing by crimp, weld, or clip.

8. The pressure regulator of claim 1, wherein the fuel outlet is disposed on the fuel cover.

9. The fuel cover of claim 8, further comprising an integral passageway directing flow of fuel from the valve biasing member to the fuel outlet.

10. The fuel cover of claim 8, further comprising an internal wall.

11. The fuel cover of claim 8, further comprises at least one snap mechanism for affixation to the flow through pressure regulator.

12. A flow through pressure regulator comprising:
a lower housing having a fuel inlet communicating with a fuel chamber wherein a flow of fuel through the fuel inlet and the fuel chamber communicates with a valve assembly;
the valve assembly regulating the flow of fuel through the lower housing to a fuel outlet wherein a ceramic valve element rests on a valve seat in a closed position to prohibit the flow of fuel from the fuel chamber to the fuel outlet;
a valve biasing member for biasing the ceramic valve element toward the fuel chamber in opposition to pressure exerted on the valve element by the fuel in the fuel chamber; and
a fuel cover for directing the flow of fuel from the valve biasing member to the fuel outlet,
wherein the valve biasing member is a flat disk having a generally y-shaped center aperture so as to make only three point contact with the ceramic valve element, the valve biasing member having a continuous annular outer edge that is fixed with respect to the lower housing, and a portion of the valve biasing member near the center aperture being freely movable so as to engage and bias the valve element under certain pressure conditions in the pressure regulator.

* * * * *